United States Patent
Borchew et al.

(10) Patent No.: US 7,173,943 B1
(45) Date of Patent: Feb. 6, 2007

(54) PROTOCOL ANALYZER AND TIME PRECISE METHOD FOR CAPTURING MULTI-DIRECTIONAL PACKET TRAFFIC

(75) Inventors: Howard Borchew, Mountain View, CA (US); Kevin Ziegler, Campbell, CA (US); Amit Bakshi, San Jose, CA (US)

(73) Assignee: Computer Access Technology Corporation, Santa Clara, CA (US)

( * ) Notice: Subject to any disclaimer, the term of this patent is extended or adjusted under 35 U.S.C. 154(b) by 1096 days.

(21) Appl. No.: 10/082,886

(22) Filed: Feb. 26, 2002

(51) Int. Cl.
*H04J 3/24* (2006.01)
(52) U.S. Cl. ............... 370/474; 370/366; 370/509
(58) Field of Classification Search ............... 370/389, 370/473, 474, 360, 400, 352, 355, 366, 357, 370/401, 509, 503, 506, 516, 517, 464, 466, 370/465, 395, 402, 409, 394, 396, 20, 395.5, 370/469, 489; 711/114, 162, 147, 149; 710/105, 710/62, 306, 128, 303, 129, 52, 56, 107, 710/316, 317, 8, 10, 11, 305, 307, 300, 313, 710/5–7, 22–28, 36–51
See application file for complete search history.

(56) References Cited

U.S. PATENT DOCUMENTS

| | | | | |
|---|---|---|---|---|
| 4,486,739 A | * | 12/1984 | Franaszek et al. | 341/59 |
| 5,363,408 A | * | 11/1994 | Paik et al. | 375/261 |
| 5,612,974 A | * | 3/1997 | Astrachan | 375/295 |
| 6,400,730 B1 | * | 6/2002 | Latif et al. | 370/466 |
| 6,594,712 B1 | * | 7/2003 | Pettey et al. | 710/22 |
| 6,732,243 B2 | * | 5/2004 | Busser et al. | 711/162 |
| 6,747,997 B1 | * | 6/2004 | Susnow et al. | 370/509 |
| 6,839,788 B2 | * | 1/2005 | Pecone | 710/305 |
| 6,944,152 B1 | * | 9/2005 | Heil | 370/360 |
| 6,988,161 B2 | * | 1/2006 | McConnell et al. | 710/316 |
| 6,990,549 B2 | * | 1/2006 | Main et al. | 710/306 |
| 2003/0014544 A1 | * | 1/2003 | Pettey | 709/249 |
| 2003/0065733 A1 | * | 4/2003 | Pecone | 709/211 |
| 2003/0065836 A1 | * | 4/2003 | Pecone | 710/62 |
| 2003/0065841 A1 | * | 4/2003 | Pecone | 710/105 |
| 2003/0088735 A1 | * | 5/2003 | Busser et al. | 711/114 |

* cited by examiner

*Primary Examiner*—Hassan Kizou
*Assistant Examiner*—Anthony Sol
(74) *Attorney, Agent, or Firm*—Menlo Patent Agency LLC; David R. Gildea

(57) ABSTRACT

An apparatus and method for selecting and recording multi-directional communication packet traffic in a compact manner in realtime while maintaining relative time between the selected packets passing in one direction and the selected packets passing in another direction. The apparatus includes a protocol interface, a block datapath, a record resource, and a trace merge memory. The protocol interface receives X and Y channel packets with interspersed idle times, segments the packets into time-aligned X and Y blocks, and eliminates idle times. The block datapath merges the X and Y blocks, then filters unneeded X and Y channel packets by purging the X and Y blocks from those packets. The record resource compares patterns for identifying the unneeded packets and trigger events. The trace merge memory records the time-aligned filtered merged block stream in a compact form for later analysis.

15 Claims, 13 Drawing Sheets

| Code (bin) | Label (blk_id) | Comment |
|---|---|---|
| 11 | BLOCK_ONE | Data bytes in this block are the first in a packet, following a valid SDP or SLP control symbol. |
| 10 | BLOCK_MIDDLE | Data bytes in this block are the middle of a packet. Zero or more of this Block may appear contiguously, to accommodate the packet size. |
| 01 | BLOCK_LAST | Data bytes in this block are the last in a packet, and were followed by a valid EGP or EBP control symbol. |
| 00 | Undefined | |

Fig. 3B

| Bit Num | Label | Definition |
|---|---|---|
| 3 | END_BAD | When set this bit signifies this packet has had some error in it, notified by a EBP symbol that has arrived at the packet's end. When cleared the packet is good, notified by a EGP symbol that has arrived at the packet's end. |
| 2 | DELIMITER_ERROR | When set indicates a sequence error in the packet delimiters SDP, SLP, EGP, and EBP. The start delimiters SDP & SLP must be followed by an end delimiter EGP or EBP. This error indicates two start delimiters were received casing a sequence error. |
| 1 | SYMBOL_ERROR | When set indicates an error has been encountered in symbol integrity. This can happen if any 10-bit symbol received is not one of the legal 10-bit encoding for the type of data expected. Once this error is encountered, no more bytes will be written to recording memory until a new, valid SDP or SLP is received. Symbol error in this Block means the data in this Block is not valid. |
| 0 | ALIGNMENT_ERROR | When set, indicates an error has been encountered in the 16-bit data alignment. While IB packets must be 32-bit aligned only 16-bit word alignment is check by hardware. This is because packet delimiters are discarded and recorded packets normally end not 32-bit aligned. |

Fig. 3D

| Code (bin) | Label | Comment |
| --- | --- | --- |
| 000 | DATA_PACKET | Determined by the SDP control symbol received before the packet |
| 001 | LINK_PACKET | Determined by the SLP control symbol received before the packet |
| 010 | ORDERED_SET | Defined as a COM control symbol followed by one of the valid bytes for a Training Sequence Ordered-Set (will not include any SKIP Ordered-Set) |
| 011 | Reserved | Reserved for future use |
| 100 | DISCONNECT | Link disconnect event, no data is recorded |
| 101 | CONNECT | Link connect event, no data is recorded |
| 110 | Reserved | Reserved for future use |
| 111 | Undefined | |

Fig. 3E

| Code (bin) | Label (most severe first) | Definition |
|---|---|---|
| 01 | SYMBOL_ERROR | When set indicates an error has been encountered in symbol integrity. This can happen if any 10-bit symbol received is not one of the legal 10-bit encoding for the type of data expected. |
| 10 | DISPARITY_ERROR | When set indicates a running disparity error occurred in the idle codes. |
| 11 | SKIP_ERROR | When set indicates a skip ordered set error occurred in the idle between packets. A skip sequence has either not been received on time (too early or too late), or an incorrect length skip sequence has been received. |
| 00 | NO_ERROR | No error in the idle between packets. |

Fig. 3F

PROTOCOL ANALYZER AND TIME PRECISE METHOD FOR CAPTURING MULTI-DIRECTIONAL PACKET TRAFFIC

BACKGROUND OF THE INVENTION

1. Field of the Invention

The invention relates generally to protocol analyzers and more particularly to a protocol analyzer and method for selecting and recording multi-directional communication packet traffic in a compact manner in realtime while maintaining relative times precisely between the selected packets passing in one direction and the selected packets passing in another direction.

2. Description of the Prior Art

Digital devices communicate by sending electronic signals through a physical transmission channel according to a specified protocol. The protocol describes the manner in which the signals are sent and defines the detailed rules that govern both the channel and the device hardware and software. The channel and the protocol are both typically specified by a formal communication protocol specification. For transmissions to be successful, each device must recognize and follow the same specification.

Most recent protocol standards are based on packets. This means that data is transmitted in discrete packets instead of continuously. A packet is defined as a discrete quantity of data organized into a bundle for transmission. Packets typically contain data that acts as a start delimiter, data that acts as an end delimiter, and data in the middle. The data in the middle includes headers, information intended for an end user, and error detection or correction data.

Protocol analyzers have been developed to store (record) communication traffic and aid in its analysis. For proper analysis the recorded traffic must indicate the order in which it was received. Because the physical channel may be idle for a significant portion of time, it is highly desirable to store a compact record by recording data only during times when the channel is actually carrying traffic. It is also desirable for a user to set parameters so that packets with certain characteristics are recorded and others are ignored. For a single channel by itself, it is relatively straightforward to detect non-idle time, select certain desired packets and record the selected packets in time order. However, it is more difficult to achieve this performance when it is necessary to record traffic from two or more channels simultaneously because the elimination of the idle time and the purging of unneeded packets for each channel causes the time alignment between the channels to be lost. Existing techniques record al time periods and then eliminate the idle time and unneeded packets with post processing. Unfortunately, these techniques can only be used for short periods of time because the size of the recording memory required for long time periods is too large to be practical and/or economical.

There is a need for a multi-channel protocol analyzer and method for making compact time-aligned records of selected packets.

SUMMARY OF THE INVENTION

It is therefore an object of the present invention to provide an apparatus and method for selecting and recording multi-directional communication packet traffic in a compact manner in realtime while maintaining relative time precisely between the selected packets passing in one direction and the selected packets passing in another direction.

Briefly, in a preferred embodiment, the present invention is a protocol analyzer including a protocol interface, a block datapath, a record resource, and a trace merge memory. The protocol analyzer receives first and second direction packets representative of communication traffic traveling in first and second directions, respectively, with interspersed idle times. The protocol interface eliminates the idle times, segments the packets into X and Y blocks, and mutually aligns the X and Y blocks according to reception times. The block datapath merges the time-aligned X and Y blocks into a merged block stream and then filters unneeded first and second direction packets by purging the X and Y blocks in the merged block stream that were segmented from those packets. The record resource compares the X and Y blocks to purge patterns and trigger event patterns entered by a user. The purge patterns are used for identifying the unneeded packets. The trigger event patterns are used to trigger the trace merge memory to stop recording. The trace merge memory records the filtered merged block stream in addresses ordered according to times that the portions of the packets in the X and Y blocks are received by the analyzer. A block pipeline and an address pipeline in the block datapath enable the record resource to detect a purge or trigger pattern in a packet before the blocks for that packet are written to the trace merge memory.

An advantage of the present invention is that a time-ordered representation of selected multi-directional packets without idle time is available for later analysis.

These and other objects and advantages of the present invention will no doubt become obvious to those of ordinary skill in the art after having read the following detailed description of the preferred embodiments which are illustrated in the various figures.

IN THE DRAWINGS

Figure 1:
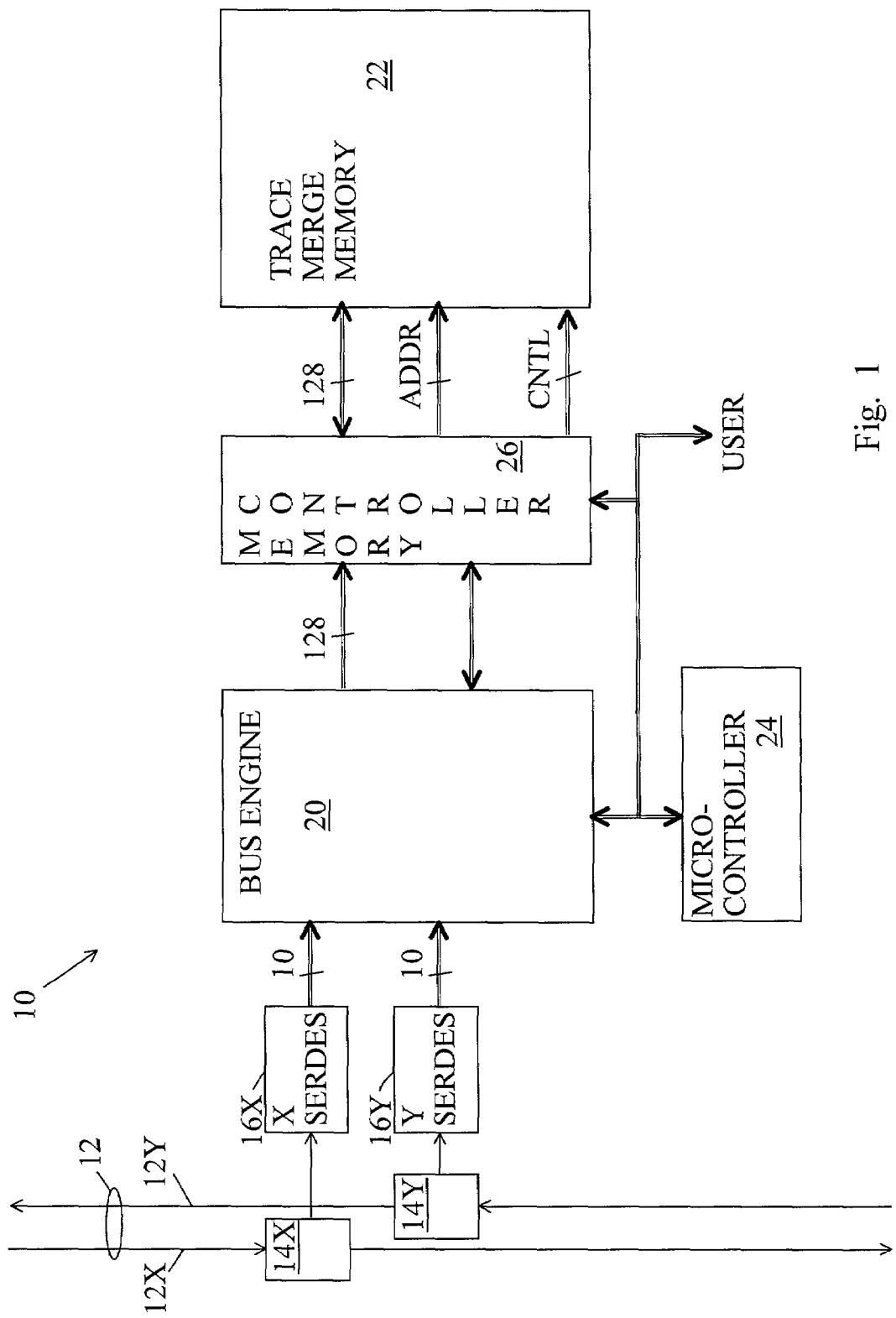
FIG. 1 is a block diagram of a protocol analyzer of the present invention.
Figure 3A:
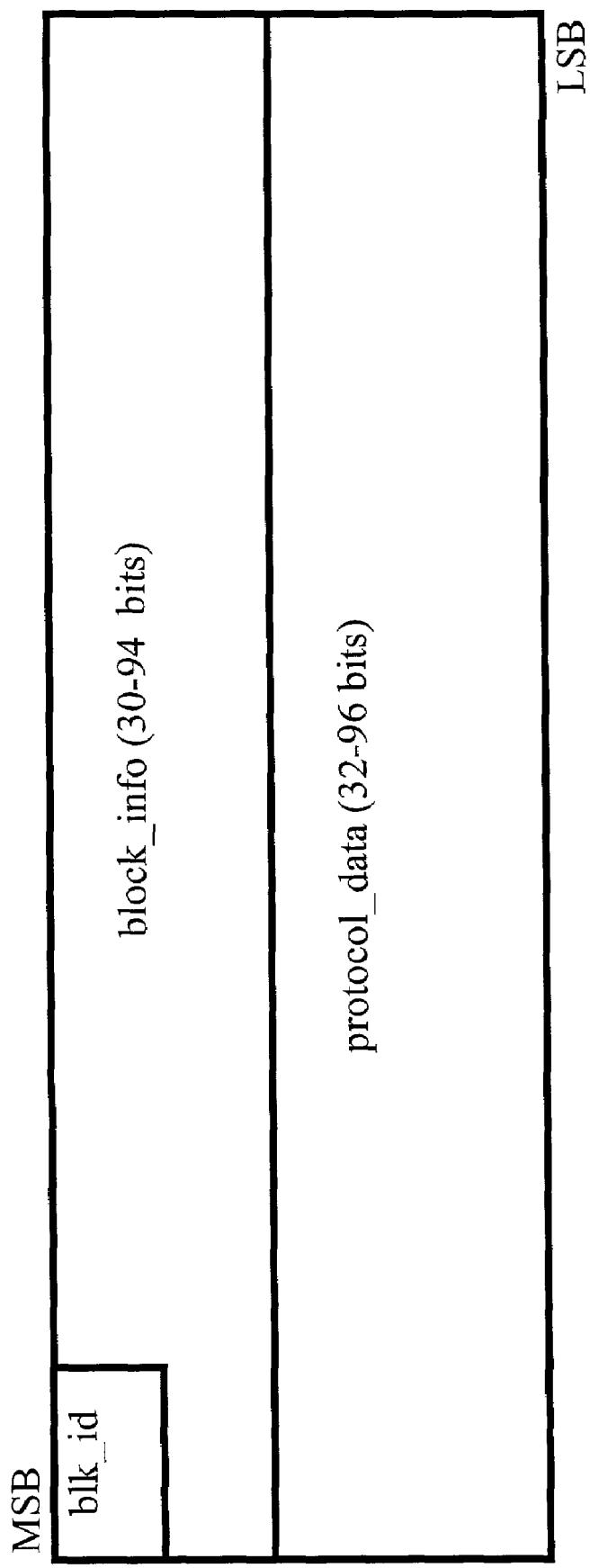
FIG. 3A illustrates the organization of a packet block recorded in a trace merge memory of the analyzer of FIG. 1.
Figure 3C:
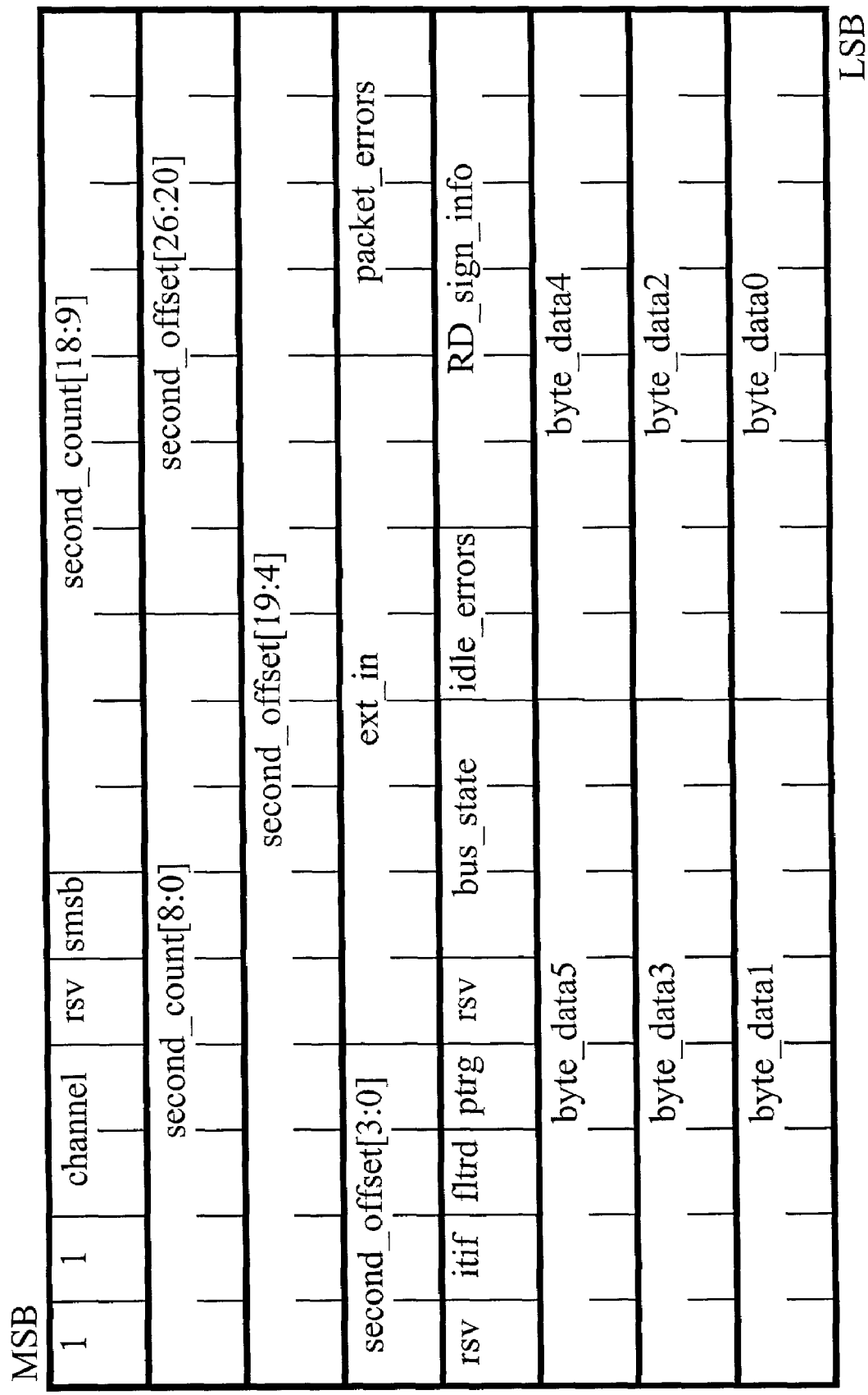
Figure 3G:
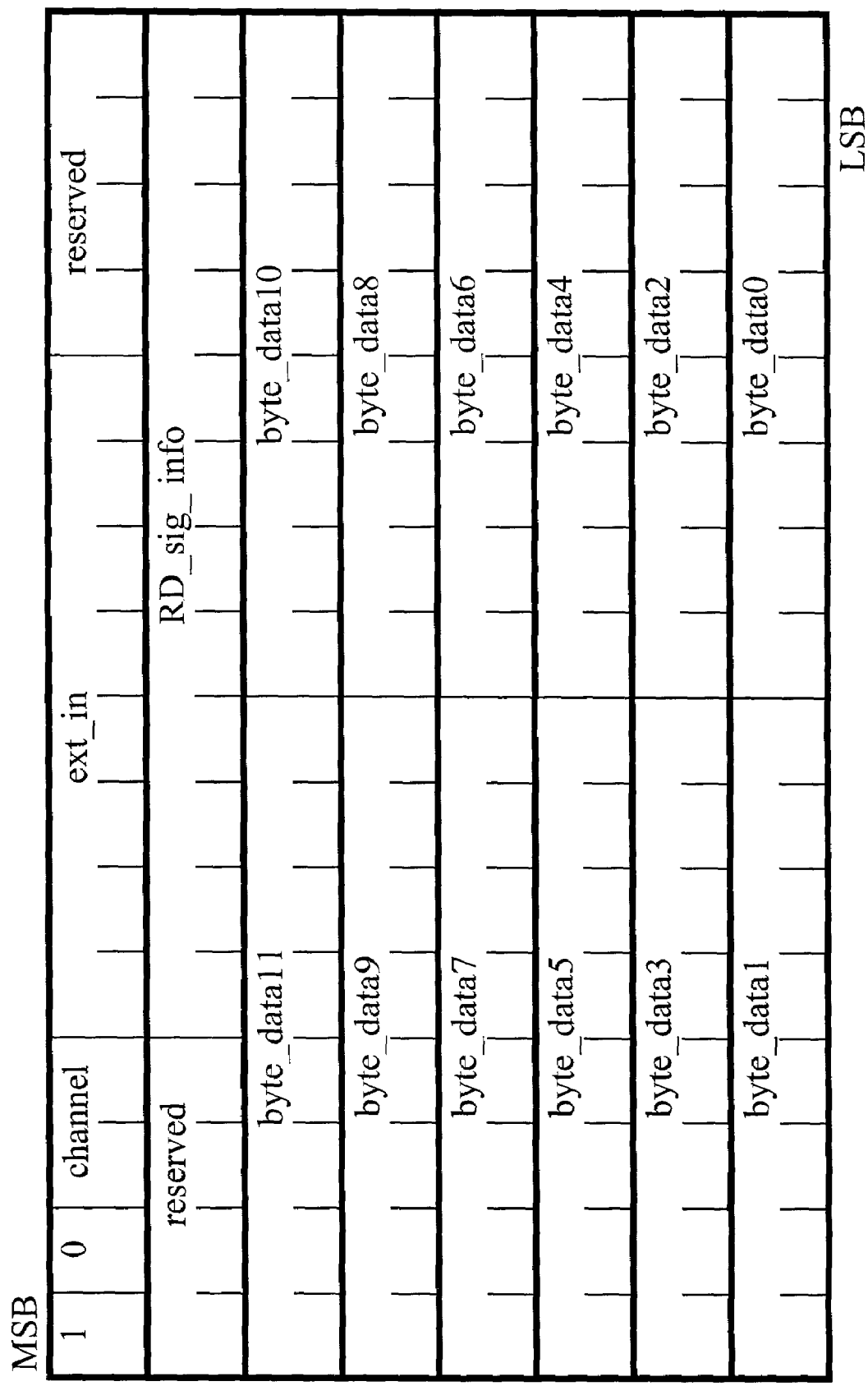
Figure 3H:
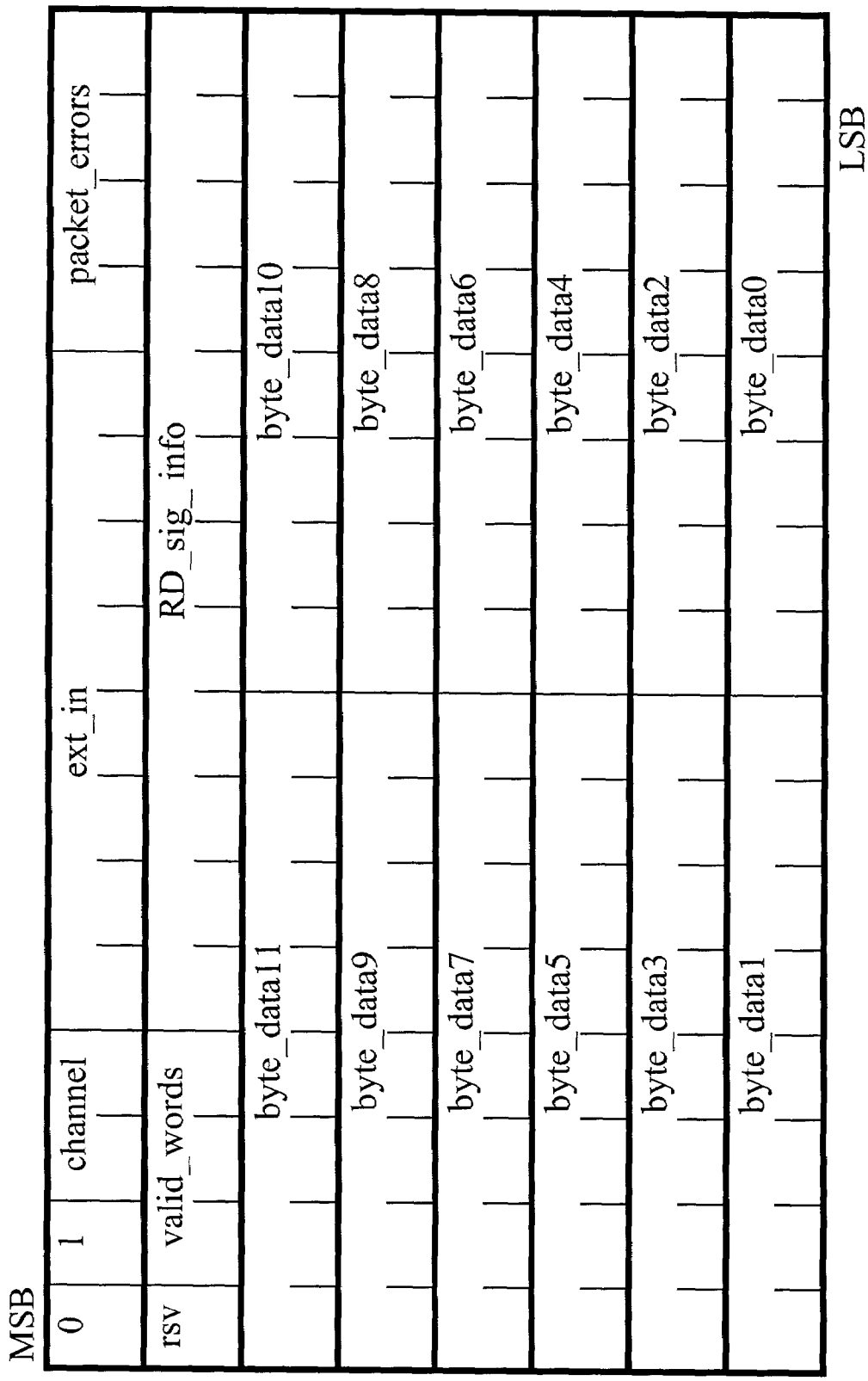
Figure 4:
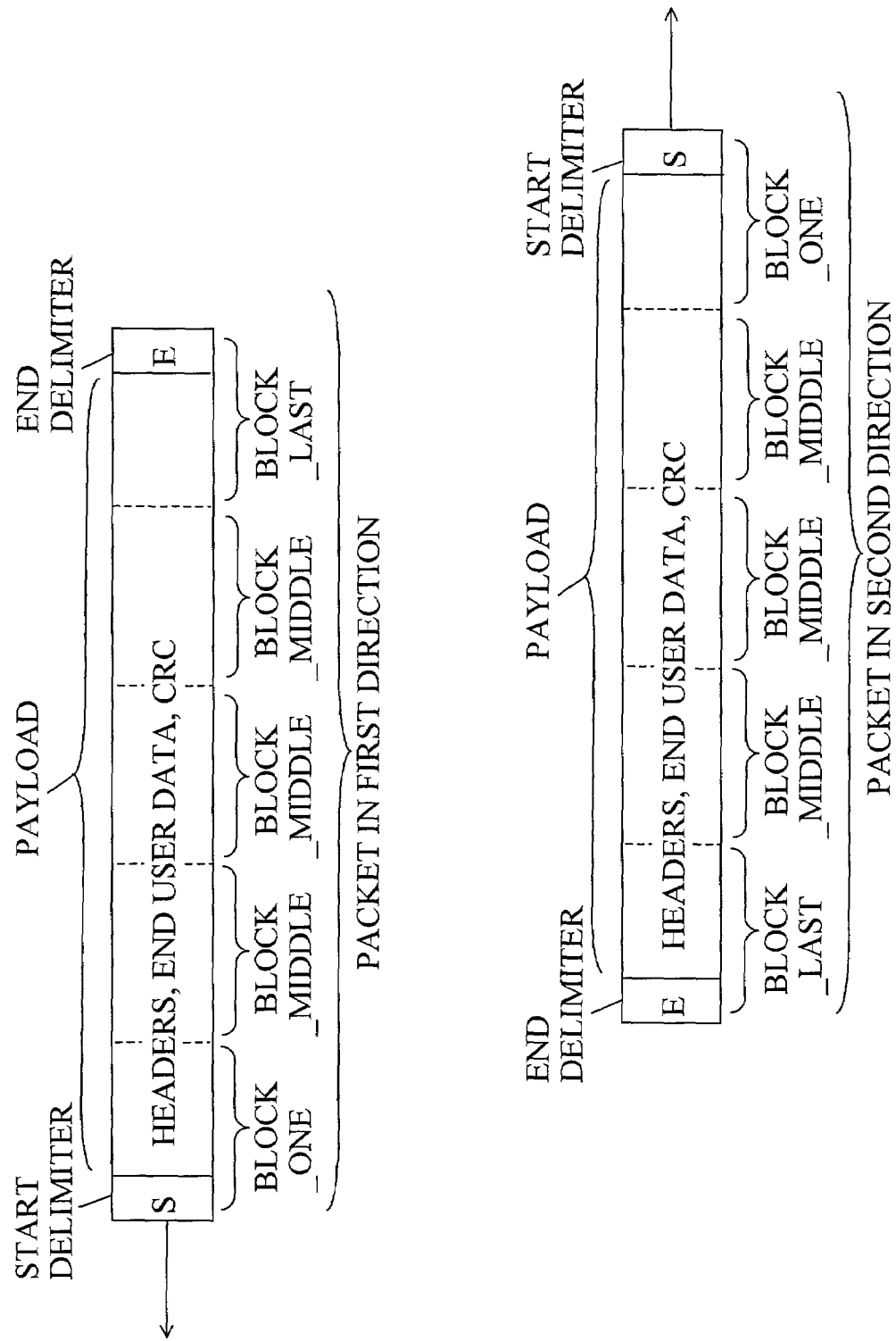
Figure 5:
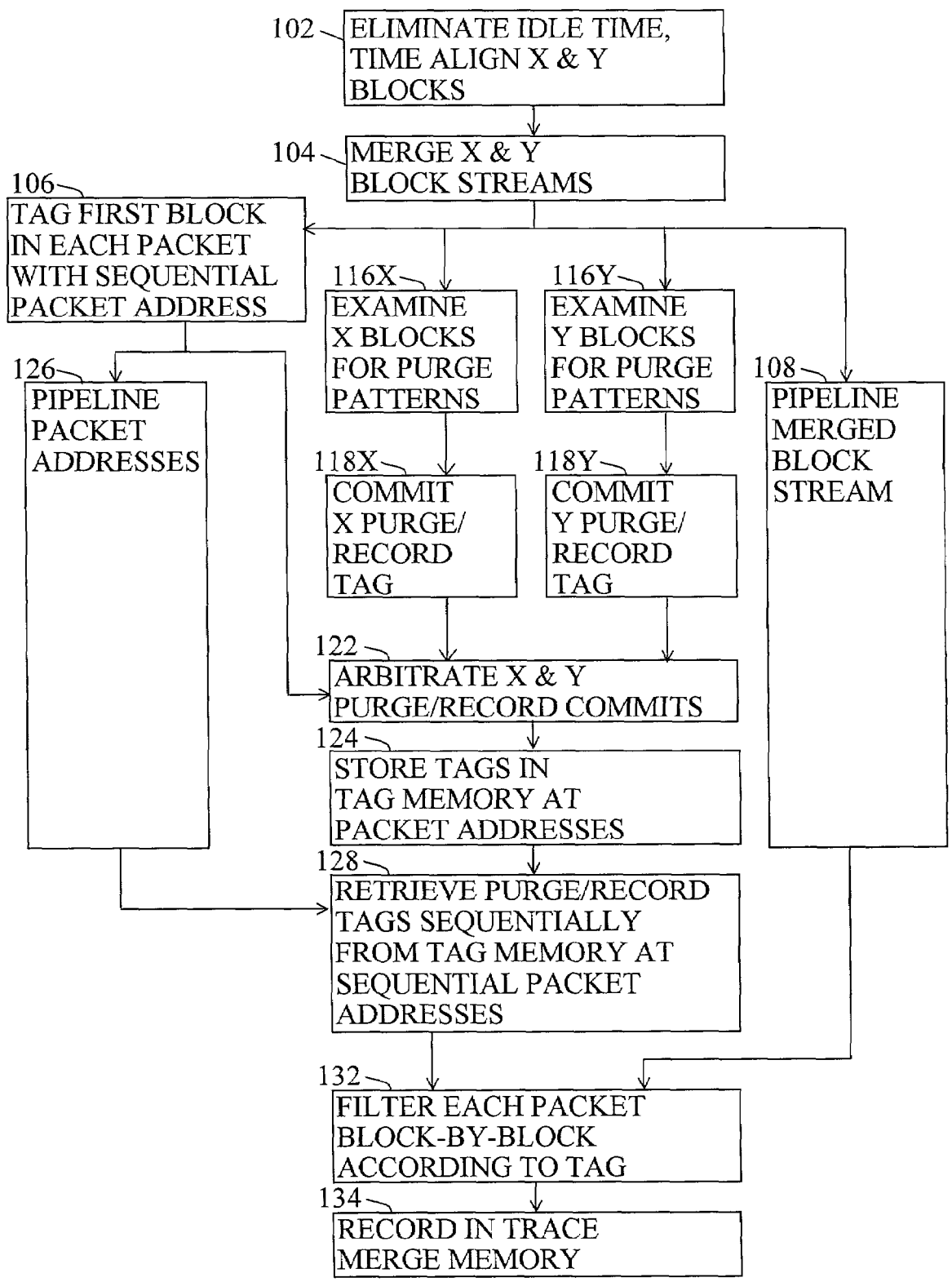
Figure 6:
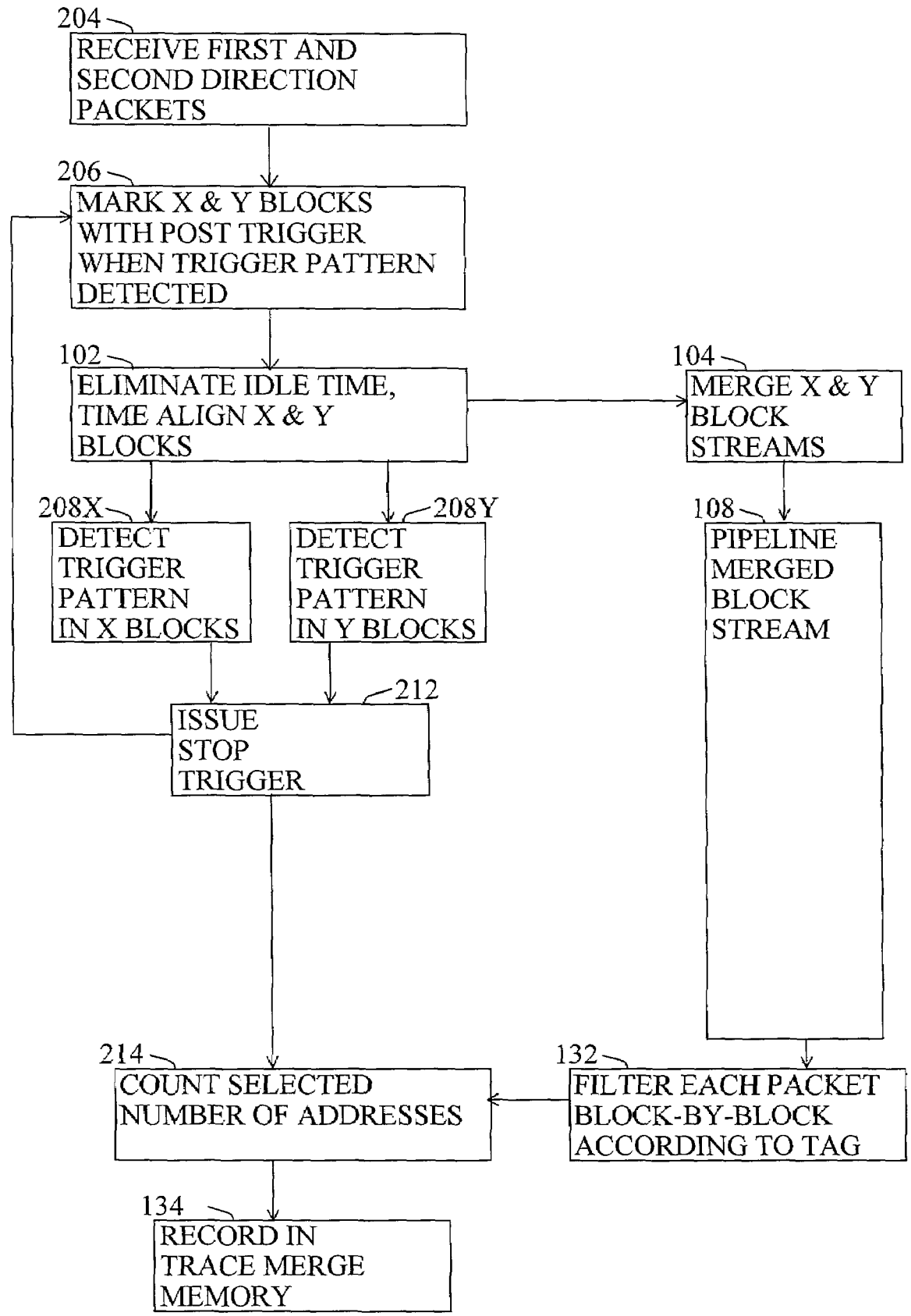

FIG. 3B specifies the encoding of various types of blocks for the packet block of FIG. 3A;

FIG. 3C shows the organization of a block_one type of the packet block of FIG. 3A;

FIG. 3D specifies the packet error indicators that are available in the packet block of FIG. 3C;

FIG. 3E specifies bus state indicators that are available in the packet block of FIG. 3C;

FIG. 3F specifies idle error indicators that are available in the packet block of FIG. 3C;

FIG. 3G shows the organization of a block_middle type of the packet block of FIG. 3A;

FIG. 3H shows the organization of a block_last type of the packet block of FIG. 3A; and FIG. 4 illustrates bi-directional burst communication traffic packets that are recorded by the protocol analyzer of FIG. 1;

FIG. 5 is a flow chart of a method for purging or recording packets in the protocol analyzer of FIG. 1; and FIG. 6 is a flow chart of a method for viewing packets before and after a trigger event.

DETAILED DESCRIPTION OF THE PREFERRED EMBODIMENTS

FIG. 1 is a block diagram of a protocol analyzer of the present invention referred to by the general reference number 10. The protocol analyzer 10 is described herein for a preferred embodiment for analyzing dual simplex communication traffic that is transmitted as packets with an Infiniband (IB) protocol using twisted wire pairs 12X and 12Y as a transmission medium 12. However, it should be understood that the ideas in the invention can equally well be applied to other protocols such as Universal Serial Bus (USB), IEEE 1394 and Serial AT Attachment (S-ATA) and other transmission media such as coaxial cables, optical fiber and wireless. For example, different frequency bands, time slots, codes, or polarities could substitute for the twisted pairs of wires 12X and 12Y.

The protocol analyzer 10 is described for two channels of operation, a channel X and a channel Y, corresponding to first and second directions of transmission through the medium 12. However, it should be understood that the idea can be expanded to a greater number of channels, for example, 4 channels (W,X,Y,Z) to 12 channels or even more. The protocol analyzer 10 of a preferred two channel Infini-Band embodiment includes an X probe 14X and a Y probe 14Y, an X serializer/deserializer (SerDes) 16X and a Y SerDes 16Y, a bus engine 20, a trace merge memory 22, a microcontroller 24, and a memory controller 26. The twisted pair of wires 12X carry communication traffic in a first direction and the twisted pair of wires 12Y carry different communication traffic in a second direction.

The X probe 14X inserts into the twisted pair of wires 12X and passes a likeness of the traffic to the X SerDes 16X. The X SerDes 16X converts X serial data on the wires 12X to 10 bit parallel X words and passes the X words to the bus engine 20. Similarly, the Y probe 14Y inserts into the twisted pair of wires 12Y and passes a likeness of the traffic to the Y SerDes 16Y. The Y SerDes 16Y converts Y serial data on the wire 12Y to 10 bit parallel Y words and passes the Y words to the bus engine 20.

For each of the X and Y channels, in a preferred embodiment two consecutive 10 bit words are carried in parallel on 20 bit bus lines. The bus engine 20 and the memory controller 26 may be constructed together in a field programmable gate array (FPGA) model APEX 20K600E commercially available from Altera and the X and Y SerDes' is 16X and 16Y may be interface devices commercially available from Agilent of Palo Alto, Calif. The trace merge memory 22 may be constructed with synchronous dynamic random access memory (SDRAM) organized as 128 bit words by however many word addresses are desired and cost effective for analysis. The SDRAM may be constructed with two PC133 256 MB dual in-line memory modules (DIMM)s.

The bus engine 20 organizes the X and Y words into X and Y channel 128 bit blocks; eliminates idle times; time stamps the X and Y channel blocks; merges the blocks; filters undesired blocks from the merged block stream; and then passes the merged filtered blocks to the trace merge memory 22 as described below. The reader may wish to refer to the diagrams of FIGS. 4–6 and 3A–H and the accompanying text for a more detailed description of the packets and the blocks. The memory controller 26 under control of the microcontroller 24 receives the merged filtered blocks from the bus engine 20 and writes the blocks into the trace merge memory 22 for later analysis at addresses in order of reception times. The blocks are recorded in a compact manner where idle time has been eliminated. The microcontroller 24 includes programming for controlling the bus engine 20 and the memory controller 26. The memory controller 26 provides addresses and control signals to the trace merge memory 22.

The analyzer 10 segments the packets in record sized blocks, time-aligns the X and Y channels, filters, triggers and records time-aligned data in real time just as the traffic is received from the medium 12. Data rates in the analyzer 10 may exceed the data rates of the traffic in order for the analyzer 10 to append time stamps, addresses and tags into the blocks of data from the traffic. In order to perform analysis, a user operates through the microcontroller 24 to read the blocks recorded in the trace merge memory 22. The method of the present invention differs markedly from the method of recording in real time and then post-processing and selecting the data and has the advantage that the amount of irrelevant data presented to a user is reduced by orders of magnitude.

Figure 2:
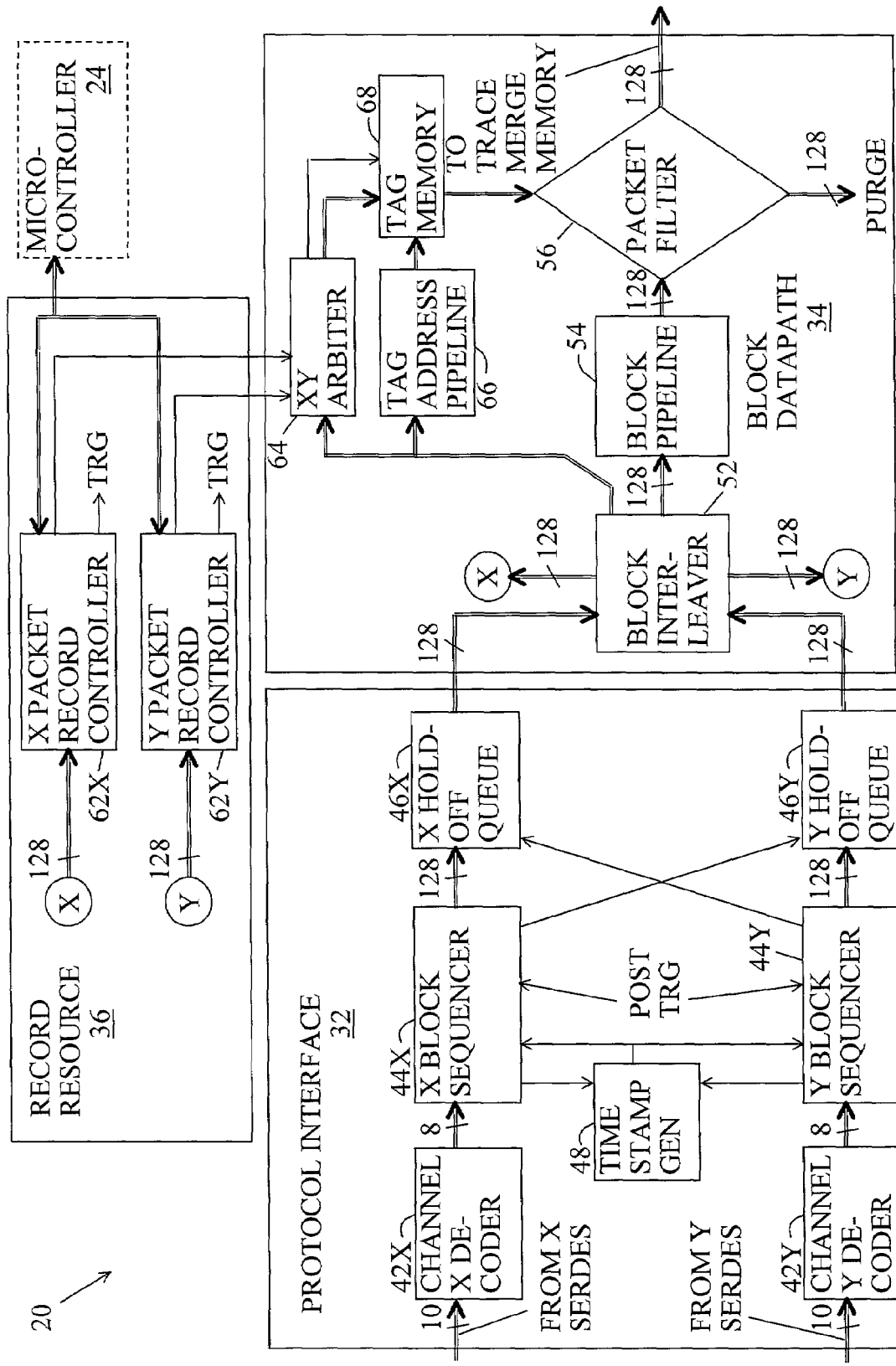
FIG. 2 is a block diagram of a bus engine of the protocol analyzer of FIG. 1.

FIG. 2 is a block diagram of the bus engine 20 of the present invention. The bus engine 20 includes a protocol interface 32, a block datapath 34, and a record resource 36. The protocol interface 32 identifies packet delimiters for separating traffic from idle time, slices or segments the packets into blocks, inserts indicator tags of various types and time stamps, and mutually time-aligns the X and Y blocks. The block data path 34 merges the blocks and filters the packets for purging or recording based upon a purge/record tag from the record resource 36. The record resource 36 operates on the blocks in parallel to the block datapath 34 to examine the packets and issue the purge/record tag based upon purge patterns and a stop recording trigger based upon event trigger patterns from the microcontroller 24.

The protocol interface 32 includes channel X and Y decoders 42X and 42Y, X and Y block sequencers 44X and 44Y, X and Y hold-off queues 46X and 46Y, and a time stamp generator (GEN) 48. The channel X decoder 42X converts 10 bit word inputs to 8 bit byte outputs according to an 8B/10B conversion described in U.S. Pat. No. 4,486,739 by Franaszek et al. incorporated by reference herein and passes the decoded 8 bit byte outputs to the X block sequencer 44X. The X block sequencer 44X concatenates the 8 bit bytes into 128 bit X blocks, inserts indicator tags and time stamps, and then passes the X blocks to the X hold-off queue 46X. The X hold-off queue 46X acts as a pipeline receiving the 128 bit X blocks at an input and issuing the 128 bit X blocks some time later to the block datapath 34. The X block sequencer 44X also monitors the data to detect the start of a new packet by detecting a start sequence delimiter. The X block sequencer 44X marks the block having the start delimiter with a BLOCK_ONE tag in order to indicate that the block is the X first block (BLOCK_ONE) in an X block sequence for a new first direction packet and also issues a mark to the time stamp generator 48. The time stamp generator 48 issues a time stamp back to the X block sequencer 44X. The X block sequencer 44X then marks the X first block (BLOCK_ONE) with the time stamp that will be used later for analyzing the precise time the first direction packets were received by the analyzer 10. The tag and the time stamp are carried as part of the 128 bit words.

Similarly, the channel Y decoder 42Y converts 10 bit word inputs to 8 bit byte outputs according to the 8B/10B conversion described in U.S. Pat. No. 4,486,739 and passes the decoded 8 bit byte outputs to the Y block sequencer 44Y. The Y block sequencer 44Y concatenates the 8 bit bytes into 128 bit Y blocks, inserts indicator tags and time stamps, and then passes the Y blocks to the Y hold-off queue 46Y. The Y hold-off queue 46Y acts as a pipeline receiving the 128 bit Y blocks at an input and issuing the 128 bit Y blocks some time later to the block datapath 34. The Y block sequencer 44Y also monitors the data to detect the start of a new packet by detecting a start sequence delimiter. The Y block sequencer 44Y marks the block having the start delimiter with a BLOCK_ONE tag in order to indicate that the block is the Y first block (BLOCK_ONE) in a Y block sequence for a new second direction packet and also issues a mark to the time stamp generator 48. The time stamp generator 48 issues a time stamp to the Y block sequencer 44Y to mark the Y first block (BLOCK_ONE) with the time stamp that will be used later for analyzing the precise time the second direction packets were received by the analyzer 10. The tag and the time stamp are carried as part of the 128 bit words.

In the burst communication traffic, idle time when no packets are present on the medium 12 is normally interleaved with active time when packets from one or more directions are present. The wires 12X may be carrying traffic while the wires 12Y are idle and vice versa, both wires 12X and 12Y may be idle, or both may be carrying packet data at the same time. When no packets of any direction are present on the medium 12 (the medium 12 is idle), the X and Y block sequencers 44X and 44Y do not generate X or Y blocks. Time stamping the first X and Y blocks (BLOCK_ONE) for new first and second direction packets reestablishes precise time for the X and Y block sequences that follow the first X and Y blocks (BLOCK_ONE).

In order to maintain time-synchronization when traffic is present on the wires 12X but not the wires 12Y, the X and Y block sequencers 44X and 44Y are cross-coupled to the Y and X hold-off queues 46Y and 46X. When the X block sequencer 44X has X blocks to issue but the Y hold-off queue 46Y has no Y blocks to receive (due to idle time on wires 12Y) the X block sequencer 44X directs the Y hold-off queue 46Y to load blank Y blocks as place holders. Similarly, when the Y block sequencer 44Y has Y blocks to issue but the X hold-off queue 46X has no X blocks to receive (due to idle time on wires 12X) the Y block sequencer 44Y directs the X hold-off queue 46X to load blank X blocks as place holders. At any given time the X and Y hold-off queues 46X and 46Y contain equal numbers of blocks, precisely mirroring the order in which data arrives from the medium 12. The X and Y hold-off queues 46X and 46Y pass the X and Y block streams to the block datapath 34. The blank X and Y blocks ensure the X and Y block streams are aligned in time when they reach the block datapath 34.

The block datapath 34 includes a block interleaver 52, a block pipeline 54, a packet filter 56, an XY arbiter 64, a tag address pipeline 66, and a tag memory 68. The block interleaver 52 purges the blank blocks from the X and Y hold-off queues 46X and 46Y and forwards the X and Y block streams to the record resource 36. Then, the block interleaver 52 merges the X and Y block streams into a merged block stream having blocks in the same time ordered sequence in which they arrived at the analyzer 10. If X and Y blocks that are not blank blocks are available from the X and Y hold-off queues 46X and 46Y at the same time, they are placed one after the other arbitrarily.

When both a first direction packet and a second direction packet are present simultaneously on the medium 12, the X and Y blocks will be interleaved. When a first direction packet but not a second direction packet is received the merged block stream has only X blocks. When a second direction packet but not a first direction packet is received the merged block stream has only Y blocks. The merged block stream is passed to the block pipeline 54. Some time later the packet filter 56 pulls the blocks from the block pipeline 54 in the same order that they were received by the block pipeline 54. In a preferred InfiniBand embodiment the block pipeline 54 is about 2046 blocks long.

The packet filter 56 filters out the blocks of the packets that were selected for purging based upon purge patterns designated by a user and passes the blocks of the packets that were not purged to the trace merge memory 22. For example, when both X and Y blocks are present in the merged block stream and the X channel packet is designated for recording but the Y channel packet is not, or vice versa, every other block will be passed to the trace merge memory 22 for recording and the other blocks will be purged.

The block interleaver 52 also generates an incrementing unique tag addresses in a single sequence to tag the first blocks (BLOCK_ONE) in the order they are merged whether the block is an X block or a Y block and issues the tag addresses in separate X and Y streams to the XY arbiter 64 and in a merged stream to the tag address pipeline 66. For an example, consider a four block sequence of a first block that is an X BLOCK_ONE, a second block that is a Y BLOCK_ONE, a third block that is a Y BLOCK_ONE and a fourth block that is an X BLOCK_ONE. The first block is tagged with address N+1, the second block with N+2, the third block with N+3 and the fourth block with N+4. The address sequence N+1, N+2, N+3, N+4 is passed to the tag address pipeline 66. The X sequence N+1 and N+4 is passed to the XY arbiter 64 and the Y sequence N+2 and N+3 is passed to the XY arbiter 64.

The record resource 36 includes X and Y packet record controllers 62X and 62Y. The X and Y packet record controllers 62X and 62Y receive X and Y purge patterns, respectively, from the microcontroller 24. The purge patterns are patterns of data that are designated by the user in order to purge (not-record) unneeded packets having those patterns somewhere in the packet. The X packet record controller 62X compares data in the X 128 bit blocks to the purge patterns to determine if the packet carried by the X blocks contains one of these purge patterns and issues or commits an X purge/record tag to the XY arbiter 64 having one sense for purging the packet and the other sense for recording the packet. The X purge/record tags are committed in the order that the first X blocks (BLOCK_ONE) are received which corresponds to the order the starts of the first direction packets are received. Similarly, the Y packet record controller 62Y compares the data in the Y 128 bit blocks to the purge patterns to determine if the packet carried by the Y blocks contains one of the purge patterns and issues or commits a purge/record tag to XY arbiter 64 having one sense for purging the packet and the other sense for recording the packet. The Y purge/record tags are issued in the order that the first Y blocks (BLOCK_ONE) are received which corresponds to the order the starts of the second direction packets are received.

The XY arbiter 64 queues the X and Y address sequences from the block interleaver 52. When the XY arbiter 64 receives an X purge/record tag it writes the sense of the tag into the tag memory 68 at the next address from its X queue. Similarly, when the XY arbiter 64 receives a Y purge/record tag it writes the sense of the tag into the tag memory 68 from the next address in its Y queue. It should be noted that an X purge/record tag for a later X block sequence (beginning with an X first block (BLOCK_ONE)) may be received at the XY arbiter 68 before or at the same time as a Y purge/record tag for an earlier Y block sequence (beginning with an Y first block (BLOCK_ONE) or vice versa.

The tag address pipeline 66 has the same length and operates in parallel to the block pipeline 54 so that some time later the tag addresses are used to read the purge/record tags in the tag memory 68 in the same order that the BLOCK_ONE blocks associated with the tag addresses are issued from the block pipeline 54. Both the block pipeline 54 and the address pipeline 66 are long enough to accommodate both a first and a second direction packet simultaneously so that all the blocks in one or both of the first and second direction packets can be checked in the record resource 36 for patterns in the blocks before the first blocks (BLOCK_

ONE) of the packets reach the packet filter 56. The packet filter 56 uses the sense of the purge/record tag for purging or recording the entire packet carried in the X and Y blocks sequence led by the BLOCK_ONE blocks. The block sequences that are to be recorded are passed to the trace merge memory 22 through the memory controller 26.

The term "pipeline" is used herein as a noun to mean a circuit and a verb to mean an act in which data is received and then it is issued some time later than it was received in the same first in first out order that it was received. In the context of the present application, the number of blocks and addresses in the block pipeline 54 and the address pipeline 66, respectively, is elastic (allowed to vary) in the same way as a queue. The outputs of the block pipeline 54 are X and Y blocks that are retrieved by the packet filter 56 and the output of the tag address pipeline 66 are addresses that are retrieved by the packet filter 56. The packet filter 56 may begin to pull blocks and tag addresses when the block pipeline 54 and the tag address pipeline 66 are about ¾ of maximum capacity.

The X and Y packet record controllers 62X and 62Y also receive trigger patterns from the microprocessor 24. The trigger patterns are patterns of data representing events that are designated by the user in order to observe the communication traffic both before and after the trigger event. The X and Y packet record controllers 62X and 62Y compare the data in the X and Y 128 bit blocks, respectively, to the trigger patterns. When a match is detected, the X or Y packet record controller 62X or 62Y detecting the match issues a trigger to the memory controller 26 to stop recording in the trace merge memory 22. The memory controller 26 also issues a post trigger POST TGR) to the X and Y block sequencers 44X and 44Y. The X and Y block sequencers 44X and 44Y then mark all new X and Y BLOCK_ONE blocks with the post trigger (ptrg) indicator.

The trace merge memory 22 is laid out into 128 bit words, termed record blocks, where the addresses of the words increase as the time of reception by the analyzer 10 increases with the provision that the increasing addresses wrap around when the maximum address is reached. The trace merge memory 22 can be read by the microcontroller 24 through the memory controller 26 for analysis and display of the record blocks and reset by the microcontroller 22 through the memory controller 26 for starting a new recording at a new time.

FIG. 3A illustrates the way in which a record block of 128 bits is organized. The record block includes a block identification field (blk_id), a block information field (block_info), and a protocol data field (protocol_data).

The block identification field (blk_id) indicates the type of record block.

The block information field (block_info) contains 30–94 bits of information about the protocol data (protocol_data). The block information field (block_info) and its length differ according to the type of block (blk_id). The bits in the block information fields (block_info) are incorporated in the 128 bit blocks by the X and Y block sequencers 44X and 44Y.

The protocol data field (protocol_data) contains four to twelve bytes of data described below as bytes of data (byte_dataN) recorded in real-time from the medium 12 and/or protocol specific data about the condition of the medium 12. The information differs according to the block identification field (blk_id) and the block information field (block_info).

FIG. 3B specifies the encoding of the block identification field (blk_id). Code "11" specifies a BLOCK_ONE record block, code "10" specifies a BLOCK_MIDDLE record block, and code "01" specifies a BLOCK_LAST record block.

FIG. 3C defines the BLOCK_ONE record block. The BLOCK_ONE record block includes a channel number (channel), a start delimiter in MSB (smsb), a second count field (second_count), a second offset field (second_offset), an external signals field (ext_in), and a packet errors field (packet_errors).

The channel number (channel) indicates the channel number (channel) that is the source of the current block allowing for four channels of simultaneous recording.

The start delimiter in MSB (smsb), when set, gives extra time precision and indicates that the start delimiter (smsb) of the present packet was received in the most significant byte of a word or second of the parallel 10 bit words from the X and Y SerDes' 16X and 16Y in a preferred embodiment. This bit may be used as the least significant bit of the time-stamp to double the time resolution of the analyzer 10. In one embodiment the analyzer 10 has a time resolution of eight nanoseconds. This bit would double the resolution to four nanoseconds.

The second count field (second_count) and the second offset field (second_offset) indicate the time stamp in seconds.

The second count field (second_count) is a 19-bit counter that counts seconds. It increments on each carry from the second offset field (second_offset). The second count field can count 524, 288 seconds, or 6 days, 1 hour, 38 minutes, and 8 seconds.

The second offset field (second_offset) is a 27-bit counter that increments on each tick of a local 125 MHz clock, with the exception that an increment from the value 124,999,999 causes a wraparound to zero and carries into the second count field (second_count). The value is the fractional part of a second of the current time, in units that are counts of a local 125 MHz clock (8 nanoseconds).

The external signals field (ext_in) indicates the state of external signals to the analyzer 10.

The packet errors field (packet_errors) is a bit significant field that, when set, indicates an error in the present packet.

The BLOCK_ONE record block also includes a reserved field (rsv), an "I think I'm first" field (itif), a filtered flag (fltrd), a post trigger (ptgr), a bus state field (bus_state), an idle errors field (idle_errors), running disparity sign information (RD_sign_info), and bytes of data (byte_dataN). The reserved field (rsv) is reserved for future expansion.

The "I think I'm first" (itif), when set, indicates the current packet is first before another packet on the other recording channel with the same or similar time stamp value. This bit should take precedence over the time-stamp for packet ordering purposes whenever the packets appear to be recorded at the same time. This flag can be used as a semaphore between channel X and Y decoders 42X and 42Y if extra precision is possible. Only one channel (channel X decoder 42X or channel Y decoder 42Y) may set this flag.

The filtered flag (fltrd), when set, indicates that some packet information was filtered just prior to the current packet.

The post trigger (ptgr) indicates this packet is being recorded after the trigger event. Because the bus engine 20 pipelines the merged block stream, the stop trigger address will be lower (the trigger event was earlier) than the address of the first memory block marked post trigger (ptrg) by an amount proportional to the length of the block pipeline 54 and contingent on how full it is. When recording is done, analysis software at a higher level should use the last address written, the stop trigger address, and a wrap around bit set inside the memory controller 26 indicating that the address counter for the trace merge memory 22 has wrapped to zero in order to calculate how much memory to read; and then read the block data to find the post trigger mark. The first block having the post trigger mark is the BLOCK_ONE block immediately following the trigger event. For high speed communication traffic the advantage of the present invention is that the data that a user must observe to view the data leading to the trigger event is reduced from mega or even giga bytes in a high speed link to a few hundred or a few thousand bytes depending upon the depth of the block pipeline 54 and other blocks between the X and Y sequencers 44X and 44Y and the trace merge memory 22.

The bus state field (bus_state), is an encoded field for indicating the recording conditions of the analyzer 10.

The idle errors field (idle_errors), is an encoded field for indicating the most severe error to occur in the idle between packets.

The running disparity (RD) sign information (RD_sign_info) has bits that relate to the data bytes in this block, with the least significant bit in this field relating to the least significant data byte in this block (byte_data0), and so on. The information carried in each bit is the RD sign that was used to extract the data byte from the 10-bit symbol that was received from the medium 12. This information is included, so that the software can reconstruct the actual symbol that was received, by using the data byte, the RD sign information (RD_sign_info) and the bus state (for control symbols). Once the software has the original 10-bit symbol information, it can then check for running disparity errors in the stream of symbols. Detailed description for reconstructing the symbols is available in U.S. Pat. No. 4,486,739 by Franaszek et al. incorporated herein by reference.

There are six bytes of data (byte_dataN) for the BLOCK_ONE record block recorded in real-time from the medium 12. The six bytes are byte_data0, byte_data1, byte_data2, byte_data3, byte_data4, and byte_data5. The right most byte of data (byte_data0) was transferred first on the serial bus. The bit ordering is little-endian, or right-to-left.

FIG. 3D specifies the packet errors field (packet_errors). A packet error END_BAD denoted by bit number 3 indicates an error within the packet. A packet error DELIMITER_ERROR denoted by bit number 2 indicates a sequence error for the packet delimiters. A packet error SYMBOL_ERROR denoted by bit number 1 indicates a 10 bit symbol was not a legal symbol for the type of data that was expected. A packet error ALIGNMENT_ERROR denoted by bit number 0 indicates an error in 16-bit alignment.

FIG. 3E specifies the encoding of the bus state field (bus_state). Code 000 is DATA_PACKET, code 001 is LINK_PACKET, code 010 is ORDERED_SET, code 011 is reserved, code 100 is disconnect, code 101 is connect, code 110 is reserved, and code 111 is undefined.

FIG. 3F specifies the encoding of the idle errors field (idle_errors). Code 01 is SYMBOL_ERROR, code 10 is DISPARITY_ERROR, code 11 is SKIP_ERROR, and code 00 is NO_ERROR.

FIG. 3G defines the BLOCK_MIDDLE record block. The BLOCK_MIDDLE record block includes the channel number (channel), the external signals field (ext_in), the reserved field (reserved), and the running disparity sign information (RD_sign_info) as described above for the BLOCK_ONE record block. The BLOCK_MIDDLE record block also includes bytes of data (byte_dataN).

There are four to twelve bytes of data (byte_dataN) for the BLOCK_MIDDLE record block recorded in real-time from the medium 12. The twelve bytes are byte_data0, byte_data1, byte_data2, byte_data3, byte_data4, byte_data5, byte_data6, byte_data7, byte_data8, byte_data9, byte_data10, and byte_data11. The right most byte of data (byte_data0) was transferred first on the serial bus. The bit ordering is little-endian, or right-to-left.

FIG. 3H defines the BLOCK_LAST recording block. The BLOCK_LAST record block includes the channel number (channel), the external signals field (ext_in), the packet errors field (packet_errors), the reserved field (rsv), the running disparity sign information (RD_sign_info), and the bytes of data (byte_dataN) as described above for the BLOCK_ONE record blocks. The BLOCK_LAST also includes a valid words field (valid_words).

The valid words field (valid_words) is a count indicating the number of valid 2-byte words contained in this recording block. It is incremented upon completing a write of a 16-bit aligned word. A value of 000B indicates that no words are valid. This can only happen if an error (either alignment error or symbol error) has been encountered in one of the first four bytes received. A value of 001B indicates the least significant word composed of byte_data0 and byte_data1 is valid and so on up to the value of 110B indicating all the bytes are valid. Bytes are filled in little-endian order, or the right most byte was received first in the InfiniBand protocol from the medium.

The memory records in the trace merge memory 22 are defined for nibbles of four bits of the record blocks. For example, in FIG. 3C the "channel" uses two nibbles in order to accommodate up to 256 channels or first through 256th directions of packets on the medium 12.

FIG. 4 shows burst communication packets in first and second directions. The packets begin with a start delimiter S and end with an end delimiter E. The data between the start and end delimiters S and E includes information that is transmitted between end users, headers (both before and after the end user information), and error checking such as a CRC. The analyzer 10 segments X and Y channel packets into blocks, processes the X and Y blocks in parallel X and Y channels, and merges the X and Y block streams. The first block in the packet is designated BLOCK_ONE, the last block in the packet is designated BLOCK_LAST, and the blocks between the first and last blocks, if any, are designated as BLOCK_MIDDLE. As shown in FIG. 3B, the BLOCK_ONE contains the first data bytes in a packet following a valid (SDP or SLP control symbol) start delimiter S. The BLOCK_MIDDLE contains data bytes in the middle of the packet. In a very short packet there is only the BLOCK_ONE block. In a long packet there will be many BLOCK_MIDDLE blocks and a BLOCK_LAST block. The BLOCK_LAST contains data bytes that are preceded by a valid (EGP or EBP) end delimiter E.

FIG. 5 is a flow chart of steps of a method of the present invention using packet tag addresses for filtering packets. In a step 102 the protocol interface 32 eliminates idle time and time-aligns the X and Y block streams according to the times when the first and second direction packets, respectively, are received by the analyzer 10. In a step 104 the X and Y block streams are interleaved into a merged block stream. The first blocks (BLOCK_ONE) in the block sequences making up the packets are tagged in a step 106 with sequential addresses in their order in the merged block stream.

The blocks in the merged block stream are pipelined (first in first out) in a step 108 to emerge some time later.

The sequential addresses are issued in a single stream to the tag address pipeline 66 in the same order as the merged BLOCK_ONE blocks. The addresses that correspond to X BLOCK_ONE blocks are issued sequentially to the XY arbiter 64 and the addresses that correspond to Y BLOCK_ONE blocks are issued sequentially to the XY arbiter 64 in separate X and Y streams.

While the merged block stream is pipelining, the data in the X and Y block sequences led by the X and Y BLOCK_ONE blocks, respectively, is examined for purge patterns by the X and Y packet record controllers 62X and 62Y in steps 116X and 116Y, respectively. X and Y purge/record tags are committed in respective steps 118X and 118Y where the X and Y purge/record tags have a purge sense when block data matches one of the purge patterns and a record sense when block data does not match any of the purge patterns. The X tags are committed in the same order the X first blocks (BLOCK_ONE) are received in the X packet record controller 62X and the Y tags are committed in the same order that the Y first blocks (BLOCK_ONE) are received in the Y packet record controller 62Y. In a step 122 the XY arbiter 64 buffers the X and Y tags and arbitrates which of the X and Y tags is to be written first into the tag memory 68, thereby eliminating the possibility that one of the X and Y tags will be lost if they are committed at the same time. In a step 124 the XY arbiter 64 stores the X and Y tags at the addresses it received in the X and Y address streams, respectively.

The packet addresses are pipelined (first in first out) in a step 126 in the same order and for the same time as the merged block stream is pipelined in the step 108. In a step 128 the packet filter 56 uses the sequential tag addresses that have been pipelined to retrieve the purge/record tags from the tag memory 68. In a step 132 the packet filter 56 purges or records, according to the sense of the tag, the X and Y block sequences block-by-block starting with the first blocks (BLOCK_ONE) associated with the tag addresses. Then, X and Y blocks that have not been purged are issued to the memory controller 26 and in a step 134 recorded by the memory controller 26 into the trace merge memory 22.

FIG. 6 is a flow chart of steps of a method of the present invention for viewing the packets before and after a trigger event. In a step 204 first and second direction packets are received by the analyzer 10, idle time is eliminated and the first and second direction packets are segmented into X and Y block sequences, respectively. In a step 206 the subsequent X first blocks (BLOCK_ONE) and the subsequent Y first blocks (BLOCK_ONE) are marked with a post trigger mark by the X and Y block sequencers 44X and 44Y when a trigger pattern is detected in a step 208X or a step 208Y. In the step 102 as described above the X and Y blocks are time aligned. Then, in the step 208X the X blocks are examined for the trigger pattern. Similarly, in the step 208Y the Y blocks are examined for the trigger pattern. In a step 212, when the trigger pattern is detected in either the X blocks or the Y blocks a stop trigger flag is issued and passed by the memory controller 26 back to the X and Y block sequencers 44X and 44Y to tag the X and Y first blocks (BLOCK_ONE) with the post trigger mark (in the step 206).

Meanwhile, roughly in parallel with the steps 208X–Y, 212 and 206, the X and Y blocks are merged in the step 104, the merged block stream is pipelined in the step 108 and the blocks of the unneeded packets from the output of the block pipeline 54 are purged in the step 132 as described above. The purged block stream is passed into the memory controller 26. In the step 214 the memory controller 26 initiates a user selected count for controlling the numbers of blocks that are to be recorded before and after the stop trigger flag is issued. Then, in the step 134 the trace merge memory 22 records, as described above, the blocks both before and after the stop trigger is issued. The user or software designed by the user then examines the block recordings in the trace merge memory 22 for the post trigger marks. The first post trigger mark serves as a close approximate locator for the recording of the packet where the trigger event occurred.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is +-intended that the appended claims be interpreted as covering all alterations and modifications as fall within the true spirit and scope of the invention.

What is claimed is:

1. A method for receiving first and second packets from first and second directions, respectively, comprising:

segmenting said first and second packets into one or more X blocks and one or more Y blocks, respectively;

interleaving said X and Y blocks into a merged block stream in a merge order according to times when said X and Y blocks are received from a communication medium;

purging certain said X blocks from said merged block stream when an X purge pattern is identified within one of said certain X blocks, wherein said certain X blocks are said X blocks segmented from a certain one of said first packets; and purging certain said Y blocks from said merged block stream when a Y purge pattern is identified within one of said certain Y blocks, wherein said certain Y blocks are said Y blocks segmented from a certain one of said second packets.

2. The method of claim 1, further comprising:

recording said X and Y blocks not purged from said merged block stream into addresses ordered according to times said X and Y blocks are received from said medium.

3. The method of claim 1, further comprising:

marking said X and Y blocks at the starts of said first and second packets as block_one blocks, a certain said X block_one starting said certain X blocks and a certain Y block_one block starting said certain Y blocks;

associating said X and Y block_one blocks with sequential packet addresses in said merge order, certain ones of said packet addresses associated with said certain X and Y block_one blocks;

pipelining said X and Y blocks in said merged block stream for providing pipelined said X and Y blocks, respectively, at a later time; and while said certain X and Y blocks are pipelining for providing certain said pipelined X and Y blocks, respectively, examining said certain X and Y blocks for said X and Y purge patterns; and storing X and Y purge/record tags at said certain packet addresses, said purge/record tags having a purge sense when said X and Y purge patterns, respectively, are identified.

4. The method of claim 3, further comprising:

pipelining said packet addresses at the same time as said X and Y blocks are pipelining for providing pipelined said packet addresses; and using certain said pipelined packet addresses associated with said certain X and Y block_one blocks for retrieving said X and Y purge/record tags; wherein the steps of purging said certain X and Y blocks includes purging said certain pipelined X and Y blocks when said X and Y purge/record tags, respectively, have said purge sense.

5. A method for receiving first and second packets from first and second directions, respectively, comprising:
  segmenting said first and second packets into one or more X blocks and one or more Y blocks, respectively;
  interleaving said X and Y blocks into a merged block stream in a merge order according to times when said X and Y blocks are received from a communication medium;
  purging certain said X blocks from said merged block stream when an X purge pattern is identified within one of said certain X blocks, wherein said certain X blocks are said X blocks segmented from a certain one of said first packets;
  stuffing blank said X blocks into an X stream of said X blocks when one of said second packets but not one of said first packets is present on said medium; and
  stuffing blank said Y blocks into a Y stream of said Y blocks when one of said first packets but not said second packets is present on said medium; wherein:
  the step of interleaving includes using said blank X and Y blocks as place holders for merging said X and Y streams and then discards said X and Y blank blocks from said merged block stream.

6. A method for receiving first and second packets from first and second directions, respectively, comprising:
  segmenting said first and second packets into one or more X blocks and one or more Y blocks, respectively;
  interleaving said X and Y blocks into a merged block stream in a merge order according to times when said X and Y blocks are received from a communication medium; and
  purging certain said X blocks from said merged block stream when an X purge pattern is identified within one of said certain X blocks, wherein said certain X blocks are said X blocks segmented from a certain one of said first packets; wherein:
  the step of segmenting includes generating X and Y streams for said X and Y blocks, respectively, when said first and second packets, respectively, are present on said medium; not generating said X and Y streams during idle times; and time stamping said X and Y block streams for reestablishing reception times of said X and Y blocks.

7. A method for receiving first and second packets from first and second directions, respectively, comprising:
  segmenting said first and second packets into one or more X blocks and one or more Y blocks, respectively;
  interleaving said X and Y blocks into a merged block stream in a merge order according to times when said X and Y blocks are received from a communication medium;
  purging certain said X blocks from said merged block stream when an X purge pattern is identified within one of said certain X blocks, wherein said certain X blocks are said X blocks segmented from a certain one of said first packets;
  pipelining said X and Y blocks in said merged block stream for providing pipelined said X and Y blocks, respectively, at a later time;
  while said X blocks are pipelining, issuing a stop trigger when one of said X blocks includes a trigger pattern; and
  recording said pipelined X and Y blocks not purged in a memory for a selected number of said pipelined X and Y blocks after said stop trigger is issued; wherein the step segmenting includes marking at least one following one of said X blocks with said post trigger mark, said post trigger mark for use by a user for locating an event corresponding to said trigger pattern.

8. An apparatus for receiving first and second said packets from first and second directions, respectively, comprising:
  X and Y block sequencers for segmenting said first and second packets into one or more X blocks and one or more Y blocks, respectively;
  a block interleaver for interleaving said X and Y blocks into a merged block stream in a merge order according to times when said X and Y blocks are received from a communication medium; and
  a packet filter for purging certain said X blocks from said merged block stream when an X purge pattern is identified within one of said certain X blocks, wherein said certain X blocks are said X blocks segmented from a certain one of said first packets; wherein:
  the packet filter is further for purging certain said Y blocks from said merged block stream when a Y purge pattern is identified within one of said certain Y blocks, wherein said certain Y blocks are said Y blocks segmented from a certain one of said second packets.

9. The apparatus of claim 8, further comprising:
  a trace merge memory for recording said X and Y blocks of said purged block stream at addresses ordered according to times said X and Y blocks are received from said medium.

10. The apparatus of claim 8, wherein:
  the X and Y block sequencers are further for marking said X and Y blocks at the starts of said first and second packets as block_one blocks, a certain said X block_one starting said certain X blocks and a certain Y block_one block starting said certain Y blocks; and
  the block interleaver is further for associating said X and Y block_one blocks with sequential packet addresses in said merge order, certain ones of said packet addresses associated with said certain X and Y block_one blocks; further comprising:
  a block pipeline for pipelining said X and Y blocks in said merged block stream for providing pipelined said X and Y blocks, respectively, at a later time;
  a record resource for examining said certain X and Y blocks for said X and Y purge patterns while said certain X and Y blocks are pipelining for providing certain said pipelined X and Y blocks, respectively, and committing X and Y purge/record tags having a purge sense when said X and Y purge patterns are identified; and
  a tag memory for storing X and Y purge/record tags at said certain packet addresses.

11. The apparatus of claim 10, further comprising:
  an address pipeline for pipelining said packet addresses at the same time as said X and Y blocks are pipelining for providing pipelined said packet addresses; wherein:
  the packet filter uses certain said pipelined packet addresses associated with said certain X and Y block_one blocks for retrieving said X and Y purge/record tags, and purges said certain pipelined X and Y blocks when said X and Y purge/record tags, respectively, have said purge sense.

12. An apparatus for receiving first and second said packets from first and second directions, respectively, comprising:
  X and Y block sequencers for segmenting said first and second packets into one or more X blocks and one or more Y blocks, respectively;

a block interleaver for interleaving said X and Y blocks into a merged block stream in a merge order according to times when said X and Y blocks are received from a communication medium;

a packet filter for purging certain said X blocks from said merged block stream when an X purge pattern is identified within one of said certain X blocks, wherein said certain X blocks are said X blocks segmented from a certain one of said first packets; and X and Y hold-off queues for stuffing blank said X blocks into an X stream of said X blocks when one of said first packets but not one of said second packets is present on said medium and stuffing blank said Y blocks into a Y stream of said Y blocks when one of said second packets but not said first packets is present on said medium, respectively; wherein:

the block interleaver uses said blank X and Y blocks as place holders for merging said X and Y streams and then discards said X and Y blank blocks for compacting said merged block stream.

13. An apparatus for receiving first and second said packets from first and second directions, respectively, comprising:

X and Y block sequencers for segmenting said first and second packets into one or more X blocks and one or more Y blocks, respectively;

a block interleaver for interleaving said X and Y blocks into a merged block stream in a merge order according to times when said X and Y blocks are received from a communication medium; and a packet filter for purging certain said X blocks from said merged block stream when an X purge pattern is identified within one of said certain X blocks, wherein said certain X blocks are said X blocks segmented from a certain one of said first packets; wherein:

the X and Y block sequencers are further for generating X and Y streams for said X and Y blocks, respectively, when said first and second packets, respectively, are present on said medium; not generating said X and Y streams during idle times; and time stamping said X and Y block streams for reestablishing reception times of said X and Y blocks.

14. An apparatus for receiving first and second said packets from first and second directions, respectively, comprising:

X and Y block sequencers for segmenting said first and second packets into one or more X blocks and one or more Y blocks, respectively;

a block interleaver for interleaving said X and Y blocks into a merged block stream in a merge order according to times when said X and Y blocks are received from a communication medium;

a packet filter for purging certain said X blocks from said merged block stream when an X purge pattern is identified within one of said certain X blocks, wherein said certain X blocks are said X blocks segmented from a certain one of said first packets;

a block pipeline for pipelining said X and Y blocks in said merged block stream for providing pipelined said X and Y blocks, respectively, at a later time;

a record resource for issuing a stop trigger while said X blocks are pipelining when one of said X blocks includes a trigger pattern; and a trace merge memory for recording said pipelined X and Y blocks not purged in a memory for a selected number of said pipelined X and Y blocks after said stop trigger is issued; wherein:

the X and Y block sequencers are further for marking at least one following one of said X blocks with said post trigger mark, said post trigger mark for use by a user for locating an event corresponding to said trigger pattern.

15. A trace merge memory for storing a representation of packets of multi-directional communication traffic, comprising:

first addressable locations having data for X blocks of first direction packets of said bursts; and second addressable locations having data for Y blocks of second direction packets of said bursts, said first addressable locations interspersed with said second addressable locations; wherein, addresses of said first and second addressable locations are ordered within the memory according to reception times of said X and Y blocks in said communication traffic; wherein:

said X blocks are differentiated as first said X blocks for said X blocks at the starts of said first direction packets, respectively, last said X blocks at the ends said first direction packets, respectively, and middle said X blocks of said first direction packets, respectively, between said first X blocks and said last X blocks; and said Y blocks are differentiated as first said Y blocks for said Y blocks at the starts of said second direction packets, respectively, last said Y blocks at the ends said second direction packets, respectively, and middle said Y blocks of said second direction packets, respectively, between said first Y blocks and said last Y blocks.

* * * * *